(12) United States Patent
Hara et al.

(10) Patent No.: US 11,003,044 B2
(45) Date of Patent: May 11, 2021

(54) ELECTRO-OPTIC DEVICE

(71) Applicants: TDK Corporation, Tokyo (JP); FUJITSU OPTICAL COMPONENTS LIMITED, Kanagawa (JP)

(72) Inventors: Hiroki Hara, Tokyo (JP); Shinji Iwatsuka, Tokyo (JP); Takashi Kikukawa, Tokyo (JP); Toshinori Matsuura, Tokyo (JP); Yasuhiro Ohmori, Kanagawa (JP); Masaharu Doi, Kanagawa (JP); Shintaro Takeuchi, Kanagawa (JP); Yoshinobu Kubota, Kanagawa (JP)

(73) Assignees: TDK CORPORATION, Tokyo (JP); FUJITSU OPTICAL COMPONENTS LIMITED, Kanagawa (JP)

( * ) Notice: Subject to any disclaimer, the term of this patent is extended or adjusted under 35 U.S.C. 154(b) by 0 days.

(21) Appl. No.: 16/799,770

(22) Filed: Feb. 24, 2020

(65) Prior Publication Data

US 2020/0272021 A1   Aug. 27, 2020

(30) Foreign Application Priority Data

Feb. 25, 2019   (JP) .............................. JP2019-031797

(51) Int. Cl.
    *G02F 1/225*   (2006.01)
    *G02F 1/035*   (2006.01)
    *G02F 1/21*    (2006.01)

(52) U.S. Cl.
    CPC .......... *G02F 1/2255* (2013.01); *G02F 1/0356* (2013.01); *G02F 1/225* (2013.01); *G02F 1/212* (2021.01); *G02F 2201/063* (2013.01); *G02F 2202/20* (2013.01)

(58) Field of Classification Search
    None
    See application file for complete search history.

(56) References Cited

U.S. PATENT DOCUMENTS

| 2004/0184755 | A1* | 9/2004 | Sugiyama | ............ G02B 6/1342 385/129 |
| 2005/0175271 | A1 | 8/2005 | Sugiyama et al. | |
| 2010/0290732 | A1* | 11/2010 | Gill | .................. B29D 11/00663 385/3 |
| 2019/0094649 | A1* | 3/2019 | Kono | ..................... G02B 6/125 |
| 2019/0146302 | A1 | 5/2019 | Iwatsuka et al. | |

FOREIGN PATENT DOCUMENTS

| JP | 2006-195383 A | 7/2006 |
| JP | 4485218 B2 | 6/2010 |
| JP | 2014-006348 A | 1/2014 |
| JP | WO2017/183484 A1 | 2/2019 |

* cited by examiner

*Primary Examiner* — Michael Stahl
(74) *Attorney, Agent, or Firm* — McDermott Will & Emery LLP (57) ABSTRACT

An electro-optic device is provided with a Mach-Zehnder optical waveguide including at least one linear section and at least one curved section and a differential RF signal electrode provided along the Mach-Zehnder optical waveguide. Optical input/output ports of the Mach-Zehnder optical waveguide are provided at one end side in a first direction in which the linear section extends. The differential RF signal electrode is provided in both the linear and curved sections.

16 Claims, 6 Drawing Sheets

ELECTRO-OPTIC DEVICE

BACKGROUND OF THE INVENTION

Field of the Invention

The present invention relates to an electro-optic device used in the fields of optical communication and optical measurement and, more particularly, to the layout of optical waveguides and electrodes in an electro-optic device such as a Mach-Zehnder optical modulator.

Description of Related Art

Communication traffic has been remarkably increased with widespread Internet use, and optical fiber communication is increasingly significant. The optical fiber communication is a technology that converts an electric signal into an optical signal and transmits the optical signal through an optical fiber and has a wide bandwidth, a low loss, and a resistance to noise.

As a system for converting an electric signal into an optical signal, there are known a direct modulation system using a laser semiconductor and an external modulation system using an optical modulator. The direct modulation system does not require the optical modulator and is thus low in cost, but has a limitation in terms of high-speed modulation and, thus, the external modulation system is used for high-speed and long-distance applications.

An optical modulator is of typical electro-optic devices, and a Mach-Zehnder optical modulator in which an optical waveguide is formed by Ti (titanium) diffusion in the vicinity of the surface of a lithium niobate single-crystal substrate has been put to practical use (see, e.g., Japanese Patent No. 4,485,218). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, JP 2006-195383A and JP 2014-6348A disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

Figure 5A:
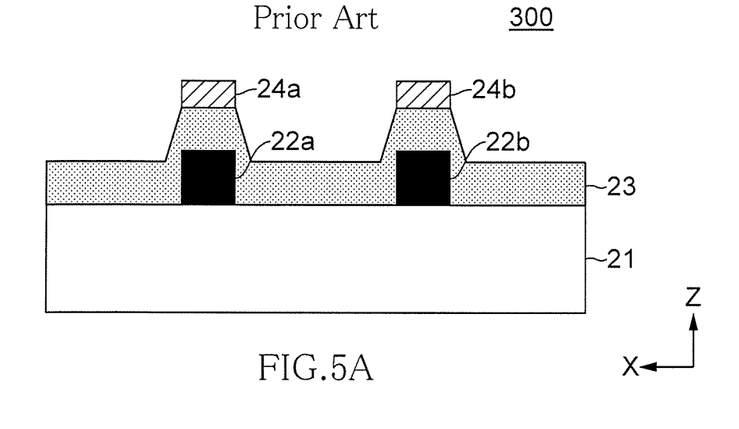
FIGS. 5A and 5B are schematic cross-sectional views each illustrating the structure of a conventional optical modulator.

The cross-sectional structure of a conventional optical modulator 300 described in JP 2006-195383A is illustrated in FIG. 5A. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 300 is of a so-called single drive type having one signal electrode 24a, and the signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring. However, the area of the ground electrode 24b is small, preventing operation at high frequencies.

Figure 5B:
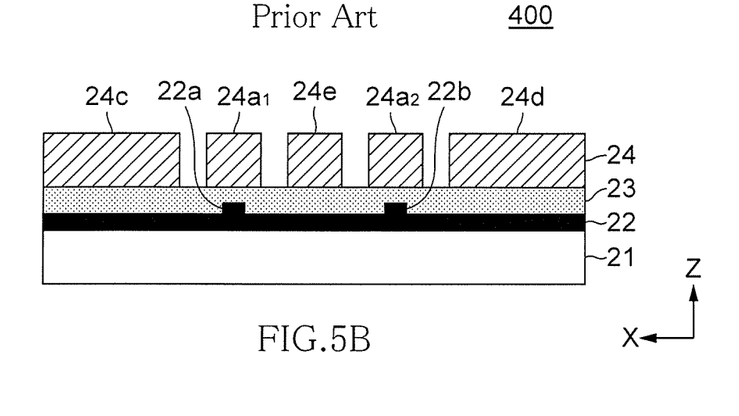

The cross-sectional structure of a conventional optical modulator 400 described in JP 2014-6348A is illustrated in FIG. 5B. Two signal electrodes $24a_1$ and $24a_2$ are disposed above a pair of optical waveguides 22a and 22b of a lithium niobate film, respectively, through a buffer layer 23, and three ground electrodes 24c, 24d and 24e are disposed so as to be separated from the signal electrodes $24a_1$ and $24a_2$. When voltages same in magnitude and opposite in polarity are applied to the two signal electrodes $24a_1$ and $24a_2$, respectively, electric fields to be applied to the optical waveguides 22a and 22b become the same in magnitude and opposite in polarity, preventing the wavelength chirp of a modulated light from occurring. Further, the amount of the chirp can be controlled by adjusting voltage to be applied to the pair of optical waveguides 22a and 22b. Furthermore, a sufficient area is ensured for the left and right ground electrodes 24c and 24d, allowing operation at high frequencies. However, the optical modulator 400 is of a dual drive type having two signal electrodes $24a_1$ and $24a_2$, complicating an electrode structure.

Figure 6:
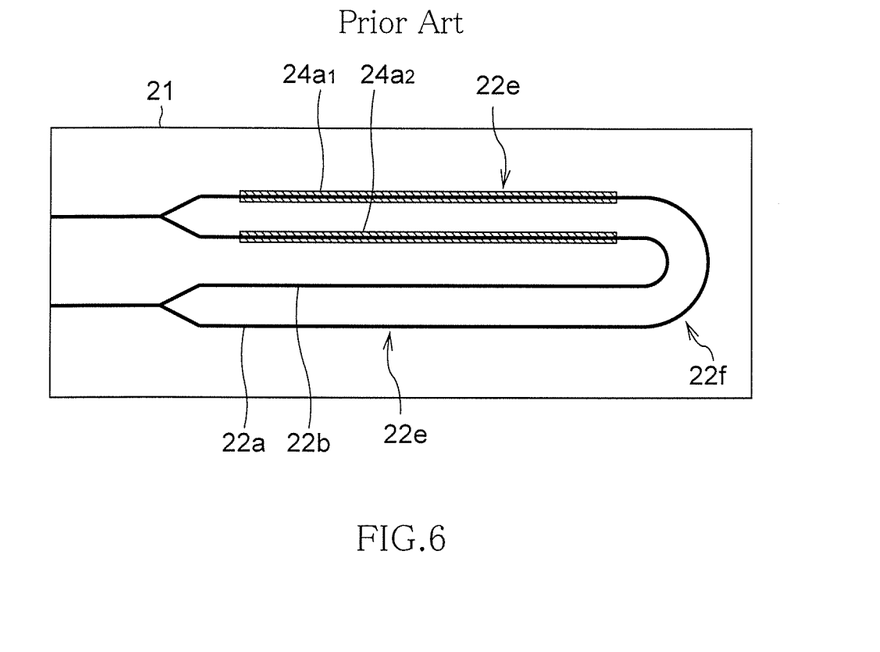
FIG. 6 is a schematic plan view illustrating another structure of the conventional optical modulator.

In order to miniaturize the optical modulator, the optical waveguides 22a and 22b need to be folded as illustrated in FIG. 6 and, thus, it is essential to provide a curved section 22f for turning the traveling direction of light by 180°. In this case, the RF signal electrodes $24a_1$ and $24a_2$ are generally disposed along a linear section 22e of the optical waveguide. International Publication WO 2017/183484 describes an optical modulator is of a single drive type. In this optical modulator, an optical waveguide has a linear section and a curved section having one signal electrode, and the signal electrode is formed also in the curved section.

In order to set drive voltage to a lower level, it is necessary to increase the length of each of the RF signal electrodes $24a_1$ and $24a_2$. However, when the linear section 22e of the optical waveguide 22 is increased in length in order to lower the drive voltage, it becomes difficult to achieve miniaturization even when the folded structure of the optical waveguide is adopted.

The optical modulator described in International Publication WO 2017/183484 has a configuration in which the signal electrode is formed at the curved section of the optical waveguide, so that the signal electrode can be increased in length; however, when a single drive type electrode is formed at the curved section, ripple tends to appear in EO characteristics (electro-optic characteristics).

SUMMARY

An object of the present invention is therefore to provide an electro-optic device having a reduced size, excellent in EO characteristics, and capable of being driven with a low voltage.

To solve the above problems, an electro-optic device according to the present invention includes a Mach-Zehnder optical waveguide constituted by a linear section and a curved section and a differential RF signal electrode provided along the Mach-Zehnder optical waveguide. Optical input/output ports of the Mach-Zehnder optical waveguide are provided at one end side in a first direction in which the linear section extends, and the differential RF signal electrode is provided in both the linear and curved sections.

According to the present invention, the differential RF signal electrode can be formed as long as possible along not only the linear section, but also the curved section, of the optical waveguide, whereby drive voltage can be set to a lower level. Further, adoption of a folded structure of the optical waveguide allows miniaturization of the electro-optic device, whereby both low voltage operation and miniaturization can be achieved. Further, the use of the differential RF signal electrode allows suppression of occurrence of ripple in EO characteristics due to disposition of the signal electrode in the curved section.

In the present invention, it is preferable that an RF signal input port of the differential RF signal electrode is provided at the other end side in the first direction. In this case, an RF signal output port of the differential RF signal electrode is preferably provided at one end side in a second direction perpendicular to the first direction.

With this configuration, the RF signal input port is provided at the side opposite to the optical input/output ports, so that it can be provided sufficiently away and isolated from the optical input/output ports, thereby facilitating connection and installation work of the electro-optic device.

In the present invention, it is preferable that the Mach-Zehnder optical waveguide includes the 1st to (2m+2)th linear sections (m is a positive integer) and the 1st to (2m+1) th curved sections and that the differential RF signal electrode is continuously provided along at least a (2n)th linear section of the Mach-Zehnder optical waveguide (n is a positive integer equal to or less than m), a (2n) th curved section, and a (2n+1)th linear section. With this configuration, the optical input port and optical output port can be disposed on the same side to allow the RF signal input port can be provided at the side opposite to the optical input/output ports. Thus, the RF signal input port can be provided away from the optical input/output ports, whereby concentration of the input/output ports can be avoided to facilitate connection and installation work of the electro-optic device. Further, the RF signal electrode is disposed in the even-numbered curved section of the optical waveguide counted from the optical input port side, so that it can be disposed on the extension of the linear electrode part, whereby the distance of a lead-out electrode from the differential RF signal electrode to the RF signal input port can be reduced as much as possible.

In the present invention, it is preferable that a multiplexer of the Mach-Zehnder optical waveguide is provided at the end portion of a (2m+1)th linear section of the Mach-Zehnder optical waveguide. With this configuration, a plurality of optical waveguides can be arranged efficiently, allowing miniaturization of the electro-optic device.

It is preferable that the electro-optic device includes a plurality of the Mach-Zehnder optical waveguides and that each of the Mach-Zehnder optical waveguides are provided parallel to one another. With this configuration, a plurality of elements can be efficiently arranged. Thus, it is possible to construct a multichannel electro-optic device having a reduced size, excellent in EO characteristics, and capable of being driven with a low voltage.

It is preferable that the curved section is formed into concentric half circles. With this configuration, a plurality of optical waveguides can be arranged efficiently, allowing miniaturization of the electro-optic device. Further, the length of the waveguide can be made equal between channels of the Mach-Zehnder optical waveguide. Thus, it is possible to construct an electro-optic device constituted by the linear and curved sections, having a reduced size, and excellent in EO characteristics.

It is preferable that a ground electrode is provided neither between two signal electrodes constituting the differential RF signal electrode nor thereoutside. When the area of the ground electrode disposed in the vicinity of the RF signal electrode cannot sufficiently be ensured due to miniaturization of the optical modulating element, the ground electrode may affect EO characteristics. In particular, when the electrode that does not have a sufficient area is disposed in the vicinity of the curved section, deterioration of EO characteristics is conspicuous. However, when the ground electrode is not provided in the vicinity of the RF signal electrode, there is no problem of deterioration in EO characteristics, and thus, it is possible to realize an electro-optic device having a reduced size and excellent in EO characteristics.

It is preferable that the Mach-Zehnder optical waveguide is a ridge waveguide of a lithium niobate film formed on the substrate. When a Mach-Zehnder optical waveguide of an electro-optic device is formed of the lithium niobate film, it is possible to form an optical waveguide having a small curvature, allowing construction of an electro-optic device having reduced size and high quality.

According to the present invention, there can be provided an electro-optic device having a reduced size, excellent in EO characteristics, and capable of being driven with a low voltage.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
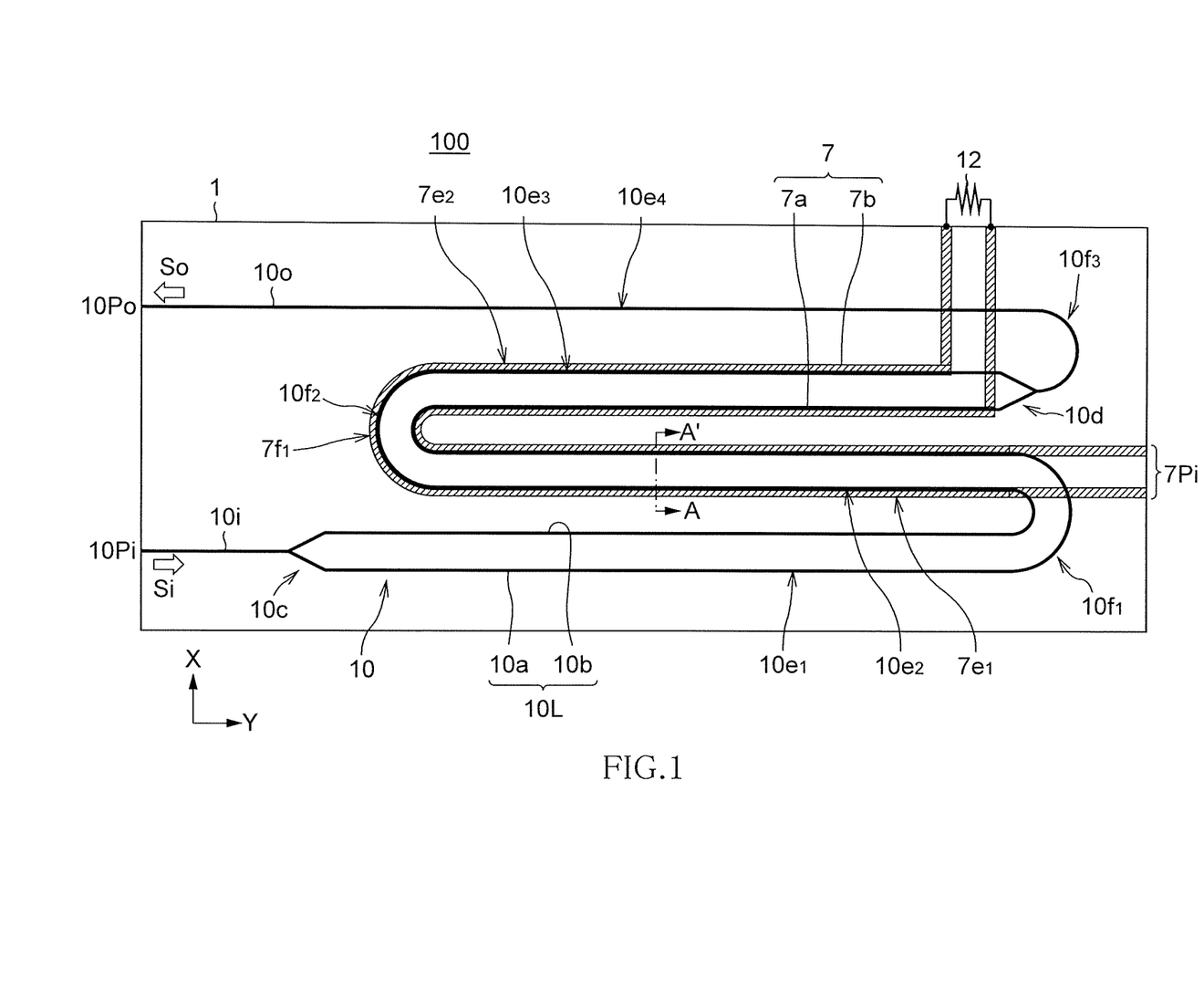
FIG. 1 is a schematic plan view illustrating the configuration of an optical modulator according to a first embodiment of the present invention.

FIG. 1 is a schematic plan view illustrating the configuration of an optical modulator according to a first embodiment of the present invention.

As illustrated in FIG. 1, an optical modulator 100 is constituted by a single Mach-Zehnder optical modulating element and includes a Mach-Zehnder optical waveguide 10 formed on a substrate 1 and having first and second optical waveguides 10a and 10b provided in parallel to each other, and a differential RF signal electrode 7 provided along the Mach-Zehnder optical waveguide 10.

The Mach-Zehnder optical waveguide 10 is an optical waveguide having a Mach-Zehnder interferometer structure. The Mach-Zehnder optical waveguide 10 includes, in the order from an optical input port 10Pi toward an optical output port 10Po, an input waveguide 10i constituted by a single optical waveguide, a demultiplexer 10c at which the input waveguide 10i is branched into two optical waveguides, a parallel waveguide 10L including the first and second optical waveguides 10a and 10b extending from the demultiplexer 10c, a multiplexer 10d at which the first and second optical waveguides 10a and 10b are combined into a single optical waveguide, and an output waveguide 10o constituted by a single optical waveguide extending from the multiplexer 10d. The first and second optical waveguides 10a and 10b branched from the input waveguide 10i are combined again into a single optical waveguide at the multiplexer 10d. An input light Si is demultiplexed at the demultiplexer 10c. The demultiplexed lights travel through the first and second optical waveguides 10a and 10b and then multiplexed at the multiplexer 10d. The multiplexed light is output from the output waveguide 10o as a modulated light So.

The Mach-Zehnder optical waveguide 10 according to the present embodiment is constructed by a combination of a linear section and a curved section. Specifically, the Mach-Zehnder optical waveguide 10 has first to fourth linear sections $10e_1$, $10e_2$, $10e_3$ and $10e_4$ arranged parallel to one another, a first curved section $10f_1$ connecting the first and second linear sections $10e_1$ and $10e_2$, a second curved section $10f_2$ connecting the second and third linear sections $10e_2$ and $10e_3$, and a third curved section $10f_3$ connecting the third and fourth linear sections $10e_3$ and $10e_4$. The first to third curved sections $10f_1$ to $10f_3$ are formed into concentric half circles so as to turn the traveling direction of the optical waveguide by 180°.

In the present embodiment, the first linear section $10e_1$ is constituted by the input waveguide 10i and parallel waveguide 10L. The first curved section $10f_1$, second linear section $10e_2$, second curved section $10f_2$ and third linear section $10e_3$ are each constituted by the parallel waveguide 10L. The third curved section $10f_3$ and fourth linear section $10e_4$ are each constituted by the output waveguide 10o constituted by a single optical waveguide.

The first to fourth linear sections $10e_1$ to $10e_4$ of the Mach-Zehnder optical waveguide 10 extend in the longitudinal direction (Y-direction) of the substrate 1, and the optical input port 10Pi and optical output port 10Po are each provided at one end side in the longitudinal direction of the substrate 1. That is, the optical input port 10Pi and optical output port 10Po are each provided at one end side in the Y-direction (first direction) in which the first to fourth linear sections $10e_1$ to $10e_4$ extend.

In the above-described configuration, the input light Si input to the optical input port 10Pi is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to that in the first linear section $10e_1$, makes a U-turn at the second curved section $10f_2$, and travels from one end of the third linear section $10e_3$ toward the other end thereof in the same direction as in the first linear section $10e_1$ and, thereafter, makes a U-turn at the third curved section $10f_3$, and travels from one end of the fourth linear section $10e_4$ toward the other end thereof in the same direction as in the second linear section $10e_2$. The output light So is output from the optical output port 10Po.

The differential RF signal electrode 7 includes a first signal electrode 7a provided along the first optical waveguide 10a and a second signal electrode 7b provided along the second optical waveguide 10b. The first and second signal electrodes 7a and 7b are provided at positions overlapping the first and second optical waveguides 10a and 10b, respectively, in a plan view. One ends of the first and second signal electrodes 7a and 7b each serve as an RF signal input port 7Pi, and the other ends (RF signal output ports) thereof are connected to each other through a terminal resistor 12.

As a result, the first and second signal electrodes 7a and 7b function as differential coplanar traveling-wave electrodes and constitute an interaction part of a Mach-Zehnder optical modulating element together with the first and second optical waveguides 10a and 10b.

In conformity to the planar shape of each of the first and second optical waveguides 10a and 10b, the first and second signal electrodes 7a and 7b are each also constructed by a combination of linear and curved sections. Specifically, the signal electrodes 7a and 7b each include a first linear electrode part $7e_1$ provided along the second linear section $10e_2$ of each of the first and second optical waveguides 10a and 10b, a first curved electrode part $7f_1$ provided along the second curved section $10f_2$ of each of the first and second optical waveguides 10a and 10b, and a second linear electrode part $7e_2$ provided along the third linear section $10e_3$ of each of the first and second optical waveguides 10a and 10b.

One end of the first linear electrode part $7e_1$ is drawn to the other end in the longitudinal direction (Y-direction) of the substrate 1 to constitute a pair of RF signal input ports 7Pi. That is, the RF signal input ports 7Pi are disposed on the extension of the first linear electrode part $7e_1$ of the signal electrode along the second linear section $10e_2$ of the optical waveguide. The other end of the first linear electrode part $7e_1$ is connected to one end of the second linear electrode part $7e_2$ through the first curved electrode part $7f_1$, and the other end (RF signal output port) of the second linear electrode part $7e_2$ is drawn to the one end side of the substrate 1 in the X-direction (second direction) perpendicular to the longitudinal direction of the substrate 1 to be connected to the terminal resistor 12.

The electrode layout described above means that the Mach-Zehnder optical waveguide 10 includes the 1st to (2m+2) th linear sections and the 1st to (2m+1) th curved sections and that the differential RF signal electrode 7 is provided along a (2n) th linear section, a (2n) th curved section and a (2n+1) th linear section of the Mach-Zehnder optical waveguide 10 (m and n are each a positive integer (m≥n)). The electrode layout illustrated in FIG. 1 is a layout when m=n=1. In this case, the multiplexer 10d is preferably provided at the end portion on the output side of a (2m+1) th linear section, and the (2m+1) th curved section and (2m+2) th linear section preferably serve as the output waveguide 10o constituted by a single optical waveguide.

For example, assuming that m=2, the Mach-Zehnder optical waveguide 10 includes first to sixth linear sections ($10e_1$ to $10e_6$) and first to fifth curved sections ($10f_1$ to $10f_5$). Then, assuming that n=1, the differential RF signal electrode 7 is provided along the second linear section, second curved section, and third linear section. Further, assuming that n=2, the differential RF signal electrode 7 is provided along a fourth linear section, a fourth curved section and a fifth linear section. Further, the differential RF signal electrode 7 can be provided continuously in a range from the second to fifth linear sections of the Mach-Zehnder optical waveguide 10.

As described above, the Mach-Zehnder optical waveguide 10 according to the present embodiment has a folded structure obtained by combining an even-number of linear sections parallel to one another and a curved section connecting the adjacent linear sections, so that the element length can be reduced to achieve miniaturization of the optical modulator. Further, the differential RF signal electrode 7 is provided not only at the linear section of the Mach-Zehnder optical waveguide 10 but also at the curved section thereof, enabling the differential RF signal electrode 7 to be as long as possible along the optical waveguide, whereby low voltage operation can be achieved. Further, the RF signal electrode 7 is of a differential type, so that ripple appearing in EO characteristics which tends to occur when the RF signal electrode is provided along the curved section of the optical waveguide can be suppressed.

Although not illustrated, a pair of bias electrodes are provided at positions overlapping the first and second optical waveguides 10a and 10b, respectively, in a plan view for application of a DC bias voltage (DC bias). One ends of the pair of bias electrodes are each an input port of the DC bias. The formation area of the pair of bias electrodes may be provided on a part of the first linear section $10e_1$ positioned closer to the optical input port 10Pi side of the Mach-Zehnder optical waveguide 10 than the formation area of the first and second signal electrodes 7a and 7b is or may be provided on a part of the fourth linear section $10e_4$ positioned closer to the optical output port 10Po side. Further, the bias electrodes may be omitted, and instead, a modulated signal including superimposed DC bias may be input to the first and second signal electrodes 7a and 7b.

Differential signals (modulated signals) having the same absolute value but opposite signs are input to the RF signal input port 7Pi. The first and second optical waveguides 10a and 10b are formed of a material, such as lithium niobate having electro-optic effect, so that the refractive indices of the first and second optical waveguides 10a and 10b are changed respectively with +Δn and −Δn by an electric field applied to the first and second optical waveguides 10a and 10b, with the result that a phase difference between the pair of optical waveguides is changed. A signal light modulated by the change in the phase difference is output from the optical output port 10Po of the optical waveguides.

As described above, the optical modulator 100 according to the present embodiment is of a dual drive type constituted by the pair of signal electrodes 7a and 7b, so that it is possible to increase the symmetry of the electric field to be applied to the pair of optical waveguides to thereby reduce the wavelength chirp.

Figure 2:
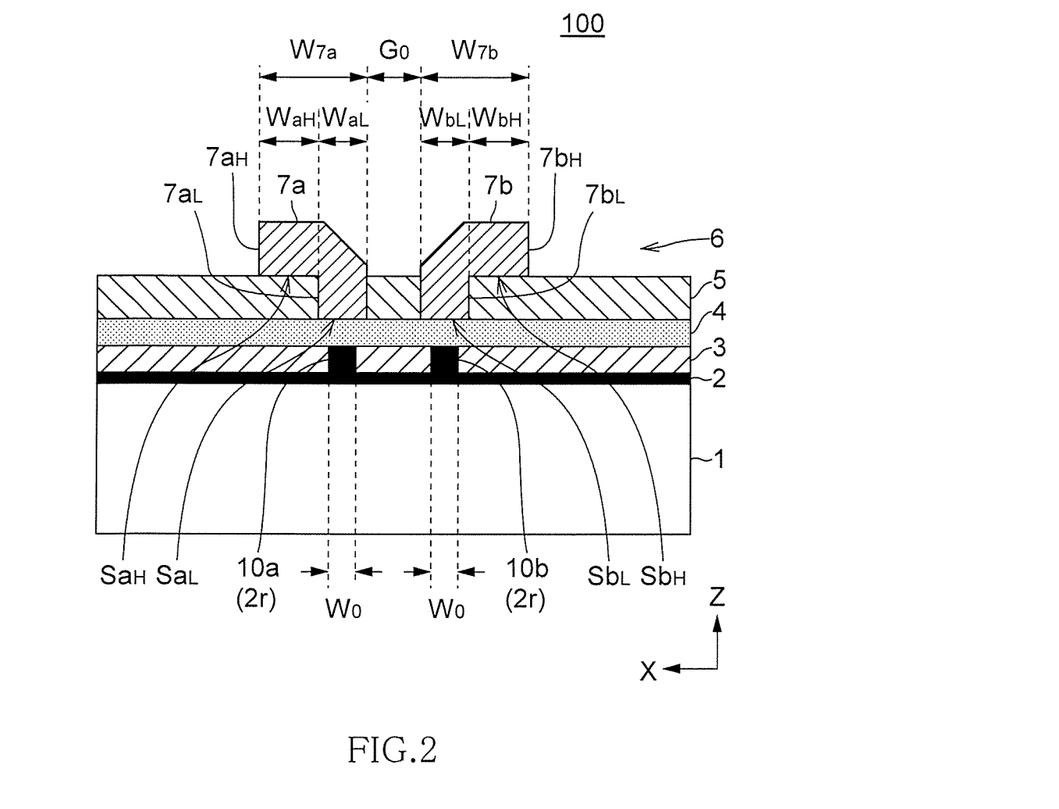
FIG. 2 is a schematic cross-sectional view of the optical modulator taken along line A-A' in FIG. 1.

FIG. 2 is a schematic cross-sectional view of the optical modulator taken along line A-A' in FIG. 1.

As illustrated in FIG. 2, the optical modulator 100 according to the present embodiment has a multilayer structure including a substrate 1, a waveguide layer 2, a protective layer 3, a buffer layer 4, an insulating layer 5 and an electrode layer 6 which are laminated in this order. The substrate 1 is, e.g., a sapphire substrate, and the waveguide layer 2 of an electro-optic material, such as a lithium niobate film, is formed on the surface of the substrate 1. The waveguide layer 2 has the first and second optical waveguides 10a and 10b each formed by a ridge part 2r. A ridge width $W_0$ of each of the first and second optical waveguides 10a and 10b can be set to, e.g., 1 μm.

The protective layer 3 is formed in an area not overlapping the first and second optical waveguides 10a and 10b in a plan view. The protective layer 3 covers the entire area of the upper surface of the waveguide layer 2 excluding portions where the ridge parts 2r are formed, and the side surfaces of each of the ridge parts 2r are also covered with the protective layer 3, so that scattering loss caused due to the roughness of the side surfaces of the ridge part 2r can be prevented. The thickness of the protective layer 3 is substantially equal to the height of the ridge part 2r of the waveguide layer 2. There is no particular restriction on the material of the protective layer 3 and, for example, silicon oxide ($SiO_2$) may be used.

The buffer layer 4 is formed on the upper surfaces of the ridge parts 2r of the waveguide layer 2 so as to prevent light propagating through the first and second optical waveguides 10a and 10b from being absorbed by the first and second signal electrodes 7a and 7b. The buffer layer 4 is preferably formed of a material having a lower refractive index than the waveguide layer 2 and a high transparency, such as $Al_2O_3$, $SiO_2$, $LaAlO_3$, $LaYO_3$, ZnO, $HfO_2$, MgO, or $Y_2O_3$, and the thickness of the buffer layer 4 on the upper surface of the ridge part 2r may be about 0.2 μm to 1 μm. Although the buffer layer 4 is more preferably formed of a material having a higher dielectric constant than the insulating layer 5, it may be formed of the same material as the insulating layer 5. In the present embodiment, although the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b. Further, the buffer layer 4 may be directly formed on the entire upper surface of the waveguide layer 2 with the protective layer 3 omitted.

The film thickness of the buffer layer 4 is preferably as large as possible in order to reduce light absorption of an electrode and preferably as small as possible in order to apply a high electric field to the first and second optical waveguides 10a and 10b. The light absorption and applied voltage of an electrode have a trade-off relation, so that it is necessary to set an adequate film thickness according to the purpose. The dielectric constant of the buffer layer 4 is preferably as high as possible, because the higher the dielectric constant thereof, the more VζL (index representing electric field efficiency) is reduced. Further, the refractive index of the buffer layer 4 is preferably as low as possible, because the lower the refractive index thereof, the thinner the buffer layer 4 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The insulating layer 5 is provided to form a level difference on the lower surface of the traveling-wave electrodes. The insulating layer 5 is preferably formed of a material having a low dielectric constant, such as $SiO_2$. Openings (slits) are formed in areas of the insulating layer that overlap the respective first and second optical waveguides 10a and 10b to expose the upper surface of the buffer layer 4 therethrough. A part of the conductive material of the electrode layer 6 is embedded in the openings, whereby the level differences are formed on the lower surfaces of the first and second signal electrodes 7a and 7b, respectively. The thickness of the insulating layer 5 is preferably equal to or larger than 1 μm. When the thickness of the insulating layer 5 is equal to or larger than 1 μm, an effect brought about by formation of the level difference on the lower surfaces of the respective first and second signal electrodes 7a and 7b can be obtained.

A part of the insulating layer 5 that exists at the lower portion of an electrode isolation area between the first and second signal electrodes 7a and 7b may be removed, and thereby the upper surface of the buffer layer 4 may be exposed. The removal of at least a part of the insulating layer 5 that exists between the first and second signal electrodes 7a and 7b allows adjustment of the effective refractive index of the traveling-wave electrodes. This allows the effective refractive index of the traveling-wave electrodes to coincide with the effective refractive index of light, whereby velocity matching can be improved.

The electrode layer 6 is provided with the first signal electrode 7a and second signal electrode 7b. The first signal electrode 7a is provided overlapping the ridge part 2r corresponding to the first optical waveguide 10a so as to modulate light traveling inside the first optical waveguide 10a and is opposed to the first optical waveguide 10a through the buffer layer 4. The second signal electrode 7b is provided overlapping the ridge part 2r corresponding to the second optical waveguide 10b so as to modulate light traveling inside the second optical waveguide 10b and is opposed to the second optical waveguide 10b through the buffer layer 4.

In the cross-sectional structure illustrated in FIG. 2 obtained by vertically cutting the first and second optical waveguides 10a and 10b, an electrode structure is left-right symmetric with respect to the midpoint between the first and second optical waveguides 10a and 10b. Thus, the magnitudes of electric fields applied from the first and second signal electrodes 7a and 7b to the respective first and second optical waveguides 10a and 10b can be made the same as much as possible, whereby the wavelength chirp can be reduced.

The electrode layer 6 may be provided with a ground electrode. When the ground electrode is provided so as to sandwich the first and second signal electrodes 7a and 7b, EO characteristics can be improved. However, when the area of the ground electrode cannot sufficiently be ensured due to miniaturization of the optical modulating element, the ground electrode may become a factor causing deterioration in EO characteristics. Thus, it is preferable not to provide the ground electrode as in the present embodiment.

Although the waveguide layer 2 is not particularly limited in type so long as it is formed of an electro-optic material, it is preferably formed of lithium niobate ($LiNbO_3$). This is because lithium niobate has a large electro-optic constant and is thus suitable as the constituent material of an optical device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The "epitaxial film" refers to a film having the crystal orientation of the underlying substrate or film. Assuming that the film surface extends in X-Y plane and that the film thickness direction is Z-axis direction, the crystal of the epitaxial film is uniformly oriented along the X-axis and Y-axis on the film surface and along the Z-axis in the thickness direction. For example, the epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since $LiNbO_3$ has a trigonal crystal system structure, single-crystal $LiNbO_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AyO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 μm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of $Y_2O_3$.

As a formation method for the lithium niobate film, there is known a method of thinly polishing or slicing the lithium niobate single crystal substrate. This method has an advantage that characteristics same as those of the single crystal can be obtained and can be applied to the present invention.

The first signal electrode 7a has a two-layer structure and has an upper layer part $7a_H$ formed on the electrode layer 6 and a lower layer part $7a_L$ embedded in an opening (first opening) penetrating the insulating layer 5. The lower layer part $7a_L$ of the first signal electrode 7a is positioned at the end portion of the upper layer part $7a_H$ of the first signal electrode 7a close to the second signal electrode 7b. Accordingly, a lower surface (first lower surface) $S_{aL}$ of the lower layer part $7a_L$ of the first signal electrode 7a is positioned closer to the second signal electrode 7b than a lower surface (second lower surface) $S_{aH}$ of the upper layer part $7a_H$ is. With such a substantially L-shaped cross-sectional structure, the first lower surface $S_{aL}$ of the first signal electrode 7a contacts the upper surface of the buffer layer 4 above the first optical waveguide 10a to cover the first optical waveguide 10a through the buffer layer 4. The second lower surface $S_{aH}$ of the first signal electrode 7a is positioned above the first lower surface $S_{aL}$ and does not contact the buffer layer 4.

A width $W_{aL}$ (width of the first lower surface $S_{aL}$) of the lower layer part $7a_L$ of the first signal electrode 7a is smaller than a width $W_{7a}$ (entire width of the first signal electrode 7a) of the upper layer part $7a_H$. The lower layer part $7a_L$ is formed only in the vicinity of an area that overlaps the first optical waveguide 10a in a plan view and is not formed in the other area. Thus, the width $W_{aL}$ of the first lower surface $S_{aL}$ of the first signal electrode 7a is slightly larger than the ridge width $W_0$ of the first optical waveguide 10a. To concentrate an electric field from the first signal electrode 7a on the first optical waveguide 10a, the width $W_{aL}$ of the first lower surface $S_{aL}$ of the first signal electrode 7a is preferably 1.1 times to 15 times, more preferably, 1.5 times to 10 times the ridge width $W_0$ of the first optical waveguide 10a. To ensure a sufficient cross-sectional area of the upper layer part $7a_H$ of the first signal electrode 7a, the width $W_{aH}$ of the second lower surface $S_{aH}$ is preferably larger than the width $W_{aL}$ of the first lower surface $S_{aL}$.

The second signal electrode 7b also has a two-layer structure and has an upper layer part $7b_H$ formed on the electrode layer 6 and a lower layer part $7b_L$ embedded in an opening (second opening) penetrating the insulating layer 5. The lower layer part $7b_L$ of the second signal electrode 7b is positioned at the end portion of the upper layer part $7b_H$ of the second signal electrode 7b close to the first signal electrode 7a. Accordingly, a lower surface (first lower surface) $S_{bL}$ of the lower layer part $7b_L$ of the second signal electrode 7b is positioned closer to the first signal electrode 7a than a lower surface (second lower surface) $S_{bH}$ of the upper layer part $7b_H$ is. With such a substantially L-shaped cross-sectional structure, the first lower surface $S_{bL}$ of the second signal electrode 7b contacts the upper surface of the buffer layer 4 above the second optical waveguide 10b to cover the second optical waveguide 10b through the buffer layer 4. The second lower surface $S_{bH}$ of the second signal electrode 7b is positioned above the first lower surface $S_{bL}$ and does not contact the buffer layer 4.

A width $W_{bL}$ (width of the first lower surface $S_{bL}$) of the lower layer part $7b_L$ of the second signal electrode 7b is smaller than a width $W_{7b}$ (entire width of the second signal electrode 7b) of the upper layer part $7b_H$. The lower layer part $7b_L$ is formed only in the vicinity of an area that overlaps the second optical waveguide 10b in a plan view and is not formed in the other area. Thus, the width $W_{bL}$ of the first lower surface $S_{bL}$ of the second signal electrode 7b is slightly larger than the ridge width $W_0$ of the second optical waveguide 10b. To concentrate an electric field from the second signal electrode 7b on the second optical waveguide 10b, the width $W_{bL}$ of the first lower surface $S_{bL}$ of the second signal electrode 7b is preferably 1.1 times to 15 times, more preferably, 1.5 times to 10 times the ridge width $W_0$ of the second optical waveguide 10b. To ensure a sufficient cross-sectional area of the upper layer part $7b_H$ of the second signal electrode 7b, the width $W_{bH}$ of the second lower surface $S_{bH}$ is preferably larger than the width $W_{bL}$ of the first lower surface $S_{bL}$.

As described above, the electrode structure is left-right symmetric, and thus the entire width $W_{7a}$ and entire width $W_{7b}$ of the first and second signal electrodes 7a and 7b are equal to each other, the widths $W_{aL}$ and $W_{bL}$ of the lower surfaces $S_{aL}$ and $S_{bL}$ of the lower layer parts $7a_L$ and $7b_L$ are also equal to each other, and the widths $W_{aH}$ and $W_{bH}$ of the lower surfaces $S_{aH}$ and $S_{bH}$ of the upper layer parts $7a_H$ and $7b_H$ are also equal to each other.

The inner side surface of the lower layer part $7a_L$ of the first signal electrode 7a is flush with the inner side surface of the upper layer part $7a_H$ of the first signal electrode 7a, and the width of the upper layer part $7a_H$ extends from the lower layer part $7a_L$ to the side opposite to the second signal electrode 7b, so that the first signal electrode 7a has a substantially L-shape in cross section. The inner side surface of the lower layer part $7b_L$ of the second signal electrode 7b is flush with the inner side surface of the upper layer part $7b_H$ of the second signal electrode 7b, and the width of the upper layer part $7b_H$ extends from the lower layer part $7b_L$ to the side opposite to the first signal electrode 7a, so that the second signal electrode 7b also has a substantially L-shape in cross section. Accordingly, a gap between the lower layer part $7a_L$ and the lower layer part $7b_L$ and a gap between the upper layer part $7a_H$ and the upper layer part $7b_H$ are equal to each other, and both are $G_0$. The gap between two electrodes refers to the shortest distance therebetween in the X-direction.

As described above, the optical modulator 100 according to the present embodiment can be miniaturized due to adoption of the folded structure of the optical waveguide. The optical modulator has a problem of a long element length in practical applications. However, by folding the optical waveguide as illustrated, the element length can be significantly reduced, obtaining a remarkable effect for miniaturization. Particularly, the optical waveguide formed of the lithium niobate film is featured in that it has small loss even when the curvature radius of the curved section is reduced up to about 50 µm and is thus suitable for the present embodiment.

Further, the differential RF signal electrode 7 is disposed along not only the linear section of the Mach-Zehnder optical waveguide 10 but also the curved section, so that it can be formed continuously as long as possible along the Mach-Zehnder optical waveguide 10. Therefore, the drive voltage can be lowered, whereby both miniaturization and low voltage operation of the optical modulator can be achieved. Further, since the RF signal electrode 7 is of a differential type, it is possible to suppress occurrence of ripple in EO characteristics which becomes a particular problem when the RF signal electrode 7 is provided along the curved section of the Mach-Zehnder optical waveguide 10.

Further, in the optical modulator 100 according to the present embodiment, the differential RF signal electrode 7 is disposed in the even-numbered curved section of the Mach- Zehnder optical waveguide 10 counted from the optical input port 10Pi side. Accordingly, the RF signal input port 7Pi can be disposed on the extension of the even-numbered linear electrode part, whereby the distance of a lead-out electrode from the differential RF signal electrode 7 to the RF signal input port 7Pi can be reduced as much as possible. Further, the RF signal input port 7Pi is provided at the side opposite to the optical input port 10Pi and optical output port 10Po, so that it can be provided away from the optical input/output ports 10Pi and 10Po, whereby concentration of the input/output ports can be avoided to facilitate connection and installation work of the optical modulator 100.

Further, in the optical modulator 100 according to the present embodiment, the first and second signal electrodes 7a and 7b each have a two-layer structure, and the widths $W_{aL}$ and $W_{bL}$ of the lower surfaces $S_{aL}$ and $S_{bL}$ of the lower layer parts $7a_L$ and $7b_L$ are smaller than the electrode widths (the maximum widths of the respective first and second signal electrodes 7a and 7b) $W_{7a}$ and $W_{7b}$ of the upper layer parts $7a_H$ and $7b_H$, respectively, so that an electric field can be concentrated on the first and second optical waveguides 10a and 10b, allowing improvement in electric field efficiency. Further, since the electrode widths $W_{7a}$ and $W_{7b}$ of the upper layer parts $7a_H$ and $7b_H$ of the first and second signal electrodes 7a and 7b are wider than the widths $W_{aL}$ and $W_{bL}$ of the lower surfaces $S_{aL}$ and $S_{bL}$ of the lower layer parts $7a_L$ and $7b_L$, the cross-sectional area of the signal electrode can be increased, allowing a reduction in electrode loss at high frequencies. Thus, it is possible to realize an optical modulator having satisfactory high-frequency characteristics and capable of being driven with a low voltage.

Figure 3:
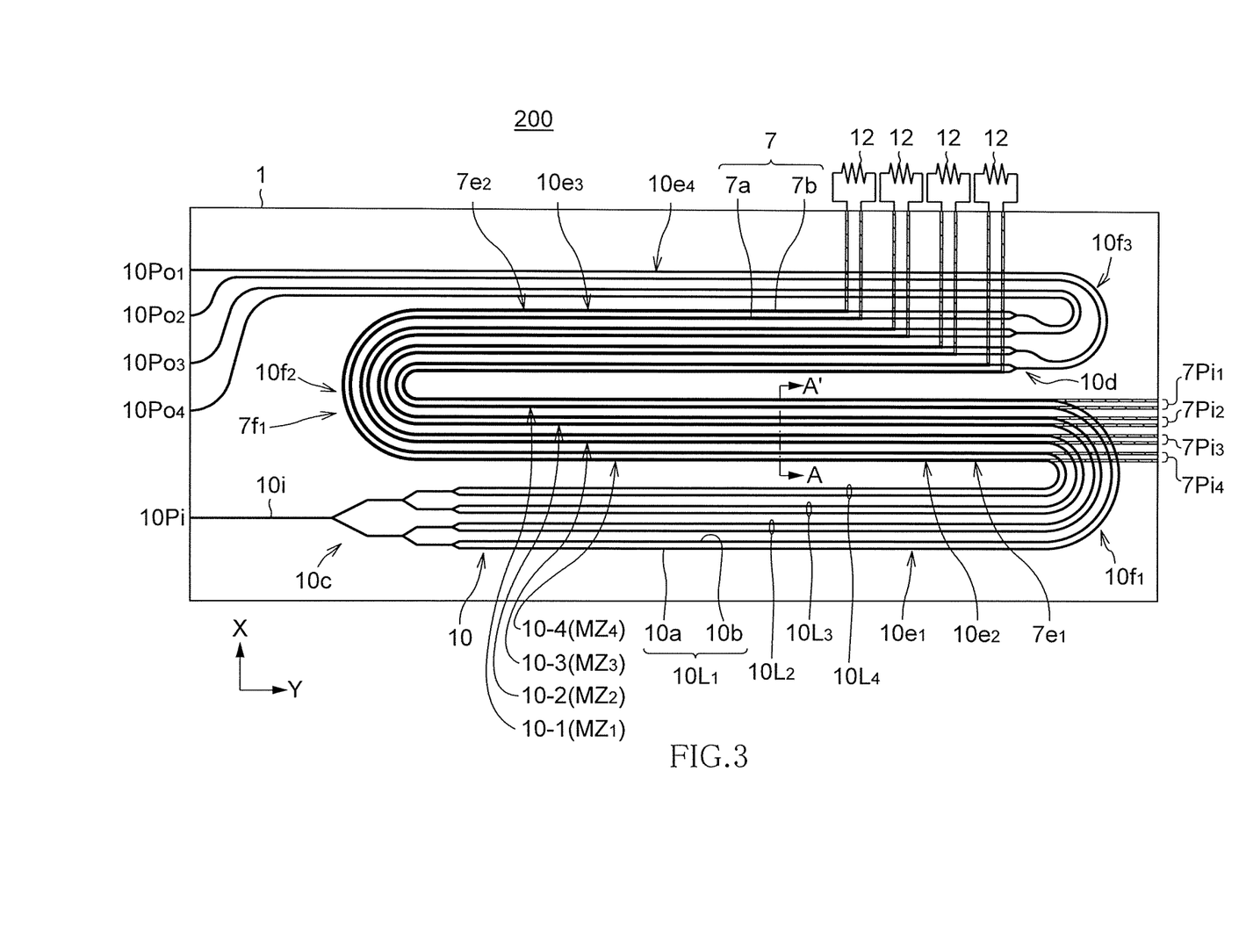
FIG. 3 is a schematic plan view illustrating the configuration of an optical modulator according to a second embodiment of the present invention.
Figure 4:
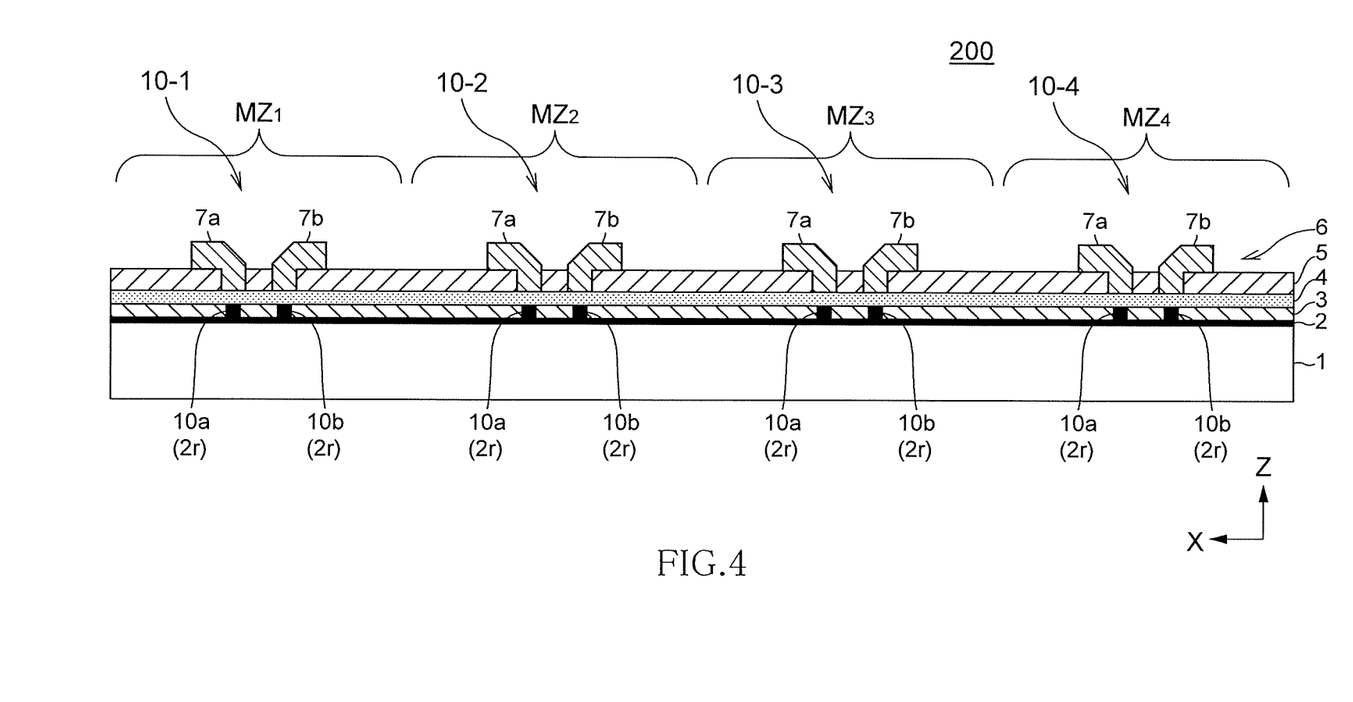
FIG. 4 is a schematic cross-sectional view of an optical modulator taken along line A-A' in FIG. 3.

FIG. 3 is a schematic plan view illustrating the configuration of an optical modulator according to a second embodiment of the present invention. FIG. 4 is a schematic cross-sectional view of an optical modulator taken along line A-A' in FIG. 3.

As illustrated in FIGS. 3 and 4, an optical modulator 200 according to the present embodiment is featured in that it has a four-channel array structure in which four interaction parts $MZ_1$ to $MZ_4$ of the Mach-Zehnder optical modulating element are arranged. Other configurations are the same as those of the first embodiment.

The input waveguide 10i constituted by a single optical waveguide is divided into eight parts by three-stage demultiplexer 10c to form four pairs of parallel optical waveguides $10L_1$, $10L_2$, $10L_3$, and $10L_4$. That is, four interaction parts $MZ_1$ to $MZ_4$ are formed. At the output side of the optical waveguides, output ends of the respective first and second optical waveguides 10a and 10b of each of the four interaction parts $MZ_1$ to $MZ_4$ are combined into a single output waveguide ($10o_1$ to $10o_4$) by one-stage multiplexer 10d, drawn out for each channel, and connected to each of first to fourth output ports $10Po_1$ to $10 Po_4$. Mach-Zehnder optical waveguides 10-1, 10-2, 10-3 and 10-4 of the respective interaction parts $MZ_1$ to $MZ_4$ are provided parallel to one another.

In the present embodiment as well, each of the Mach-Zehnder optical waveguides 10-1, 10-2, 10-3 and 10-4 includes first to fourth linear sections $10e_1$, $10e_2$, $10e_3$ and $10e_4$ disposed parallel to one another, a first curved section $10f_1$ connecting the first and second linear sections $10e_1$ and $10e_2$, a second curved section $10f_2$ connecting the second and third linear sections $10e_2$ and $10e_3$, and a third curved section $10f_3$ connecting the first and second linear sections $10e_3$ and $10e_4$. The first linear section $10e_1$ is constituted by an input waveguide 10i and parallel waveguides $10L_1$ to $10L_4$. The first curved section $10f_1$, second linear section $10e_2$, second curved section $10f_2$ and third linear section $10e_3$ are constituted by the parallel waveguides $10L_1$ to $10L_4$ and multiplexer 10d. The third curved section $10f_3$ and the fourth linear section $10e_4$ are constituted by the four output waveguides $10o_1$ to $10o_4$ corresponding to four Mach-Zehnder optical waveguides 10-1, 10-2, 10-3 and 10-4.

The optical input port 10Pi and optical output ports 10Po1 to 10 Po4 are provided at one end side in the extending direction (Y-direction) of the first to fourth linear sections $10e_1$, $10e_2$, $10e_3$ and $10e_4$ of the optical waveguide.

In the present embodiment as well, the differential RF signal electrode 7 is disposed along not only the linear section of the Mach-Zehnder optical waveguide 10 but also the curved section, so that it can be formed continuously as long as possible along the Mach-Zehnder optical waveguide 10. Therefore, the drive voltage can be lowered, whereby both miniaturization and low voltage operation of the optical modulator can be achieved. Further, since the RF signal electrode 7 is of a differential type, it is possible to suppress the occurrence of ripple in EO characteristics which becomes a particular problem when the RF signal electrode 7 is provided along the curved section of the Mach-Zehnder optical waveguide 10.

Further, the differential RF signal electrode 7 is disposed in the even-numbered curved section of the Mach-Zehnder optical waveguide 10 counted from the optical input port 10Pi side. Accordingly, RF signal input ports $7Pi_1$ to $7Pi_4$ can be disposed on the extensions of the even-numbered linear electrode parts, whereby the distance of a lead-out electrode from the differential RF signal electrode 7 to the RF signal input port 7Pi can be reduced as much as possible. Further, RF signal input ports $7Pi_1$ to $7pi_4$ are provided at the side opposite to the optical input port 10Pi and optical output ports $10Po_1$ to $10Po_4$, so that they can be provided away from the optical input/output ports 10Pi and $10Po_1$ to $10Po_4$, whereby concentration of the input/output ports can be avoided to facilitate connection and installation work of the optical modulator 200.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10a and 10b each formed of the lithium niobate film epitaxially grown on the substrate 1; however, the present invention is not limited to such a structure, but the optical waveguides may be formed of an electro-optic material such as barium titanate or lead zirconium titanate. However, the optical waveguide formed of the lithium niobate film can be reduced in width, so that a problem of electric field concentration is conspicuous, and thus the effects of the present invention are great. Further, as the waveguide layer 2, a semiconductor material, a polymer material or the like having electro-optic effect may be used.

Further, although the lower surfaces of the respective first and second signal electrodes 7a and 7b each have a two-step structure in the present invention, they may each have a step structure of three or more steps. In this case, a surface contacting the buffer layer 4 is the lower surface of the lower layer part. Further, the lower layer parts of the first and second signal electrodes 7a and 7b may have a tapered shape in which the widths thereof are gradually reduced toward the first and second optical waveguides 10a and 10b, respectively.

Further, the present invention may be applied not only to optical modulators but also to various electro-optic devices.

What is claimed is:

1. An electro-optic device comprising:
   a Mach-Zehnder optical waveguide including at least one linear section and at least one curved section; and
   a differential RF signal electrode provided along the Mach-Zehnder optical waveguide, wherein
   Optical input/output ports of the Mach-Zehnder optical waveguide are provided at one end side in a first direction in which the linear section extends, and
   the differential RF signal electrode is provided along both the linear and curved sections and constitutes an interaction part of a Mach-Zehnder modulating element together with the Mach-Zehnder optical waveguide.

2. The electro-optic device as claimed in claim 1, wherein an RF signal input port of the differential RF signal electrode is provided at the other end side in the first direction.

3. The electro-optic device as claimed in claim 1, wherein
   the Mach-Zehnder optical waveguide includes 1st to (2m+2)th linear sections (m is a positive integer) and 1st to (2m+1)th curved sections, and
   the differential RF signal electrode is continuously provided along at least a (2n)th linear section of the Mach-Zehnder optical waveguide (n is a positive integer equal to or less than m), a (2n)th curved section, and a (2n+1)th linear section.

4. The electro-optic device as claimed in claim 3, wherein a multiplexer of the Mach-Zehnder optical waveguide is provided at the end portion of a (2m+1)th linear section of the Mach-Zehnder optical waveguide.

5. The electro-optic device as claimed in claim 1 comprising a plurality of the Mach-Zehnder optical waveguides and each of the Mach-Zehnder optical waveguides are provided parallel to one another.

6. The electro-optic device as claimed in claim 5, wherein a plurality of the curved sections located at a same section in the plurality of the Mach-Zehnder optical waveguides is formed into concentric half circles.

7. The electro-optic device as claimed in claim 1, wherein a ground electrode is provided neither between two signal electrodes constituting the differential RF signal electrode nor thereoutside.

8. The electro-optic device as claimed in claim 1, wherein the Mach-Zehnder optical waveguide is a ridge waveguide of a lithium niobate film formed on a substrate.

9. An electro-optic device comprising:
   a Mach-Zehnder optical waveguide including at least one linear waveguide section and at least one curved waveguide section; and
   a differential RF signal electrode provided along the Mach-Zehnder optical waveguide, wherein
   optical input/output ports of the Mach-Zehnder optical waveguide are provided at one end side in a first direction in which the linear waveguide section extends, and
   the differential RF signal electrode includes a linear electrode section provided along the linear waveguide section and a curved electrode section provided along the curved waveguide section.

10. The electro-optic device as claimed in claim 9, wherein an RF signal input port of the differential RF signal electrode is provided at the other end side in the first direction.

11. The electro-optic device as claimed in claim 9, wherein
    the Mach-Zehnder optical waveguide includes 1st to (2m+2)th linear waveguide sections (m is a positive integer) and 1st to (2m+1)th curved waveguide sections, and
    the differential RF signal electrode is continuously provided along at least a (2n)th linear waveguide section (n is a positive integer equal to or less than m), a (2n)th curved waveguide section, and a (2n+1)th linear waveguide section.

12. The electro-optic device as claimed in claim 11, wherein a multiplexer of the Mach-Zehnder optical waveguide is provided at the end portion of a (2m+1)th linear waveguide section of the Mach-Zehnder optical waveguide.

13. The electro-optic device as claimed in claim 9, further comprising a plurality of the Mach-Zehnder optical waveguides and each of the Mach-Zehnder optical waveguides are provided parallel to one another.

14. The electro-optic device as claimed in claim 13, wherein a plurality of the curved waveguide sections located at a same section in the plurality of the Mach-Zehnder optical waveguides is formed into concentric half circles.

15. The electro-optic device as claimed in claim 9, wherein a ground electrode is provided neither between two signal electrodes constituting the differential RF signal electrode nor thereoutside.

16. The electro-optic device as claimed in claim 9, wherein the Mach-Zehnder optical waveguide is a ridge waveguide of a lithium niobate film formed on a substrate.

* * * * *